INVENTOR.
Peter Hedgewick
BY
Barnard, McGlynn & Reising
ATTORNEYS

United States Patent Office 3,555,606
Patented Jan. 19, 1971

3,555,606
MOLDING APPARATUS FOR MAKING ONE-PIECE
PLASTIC CAPS FOR CONTAINERS
Peter Hedgewick, Windsor, Ontario, Canada, assignor to Reflex Corporation of Canada Limited, Windsor, Ontario, Canada
Filed Sept. 16, 1968, Ser. No. 759,911
Int. Cl. B29c 11/00
U.S. Cl. 18—2                           25 Claims

ABSTRACT OF THE DISCLOSURE

Molding apparatus for molding a one-piece plastic cap including a first mold portion with a cavity for defining the outer surface of the base and outer surface of a peripheral flange of the cap. A second mold portion projects into the cavity for defining the inner surfaces of the base and flange, and is formed with notches to define inwardly projecting lugs on the flange of the cap. The notches each have a surface extending upwardly and outwardly. The second mold portion comprises a plurality of core members which cooperate to define an annular slot for defining an axially extending flexible web for the cap. The core members are separable from each other to release the web from confinement. When the first mold portion is removed from the second mold portion, and the core members are separated from each other, a third mold portion strips the cap from the remaining core member by flexibly forcing the lugs from the notches.

---

This invention relates generally to molding apparatus for molding plastic articles, and is particularly concerned with molding apparatus for molding one-piece plastic caps of the type having a base and a peripheral flange extending axially therefrom with inwardly projecting locking lugs on the peripheral flange for engagement with locking elements of the container to which the cap is to be applied.

Hedgewick U.S. Pat. No. 3,344,942 dated Oct. 3, 1967 discloses a one-piece plastic safety cap of the type that is applied to and removed from a container by axial movement of the cap relative to the container followed by rotative movement of the cap relative to the container to respectively engage and disengage inwardly projecting locking lugs on the flange of the cap from locking elements on the container to which the cap is applied. It is difficult for a child to accomplish such motion and thereby obtain access to the contents of the container.

In order to resiliently bias the locking lugs of such caps into engagement with the container locking elements, the cap disclosed in the above-referred-to Hedgewick patent further includes a resilient annular web projecting radially and axially from the inner surface of the base of the cap for engagement with the container. Additional caps of this general type are disclosed in the copending application of Hedgewick, Ser. No. 715,391, filed Mar. 22, 1968, the entire disclosure of which is incorporated herein by reference. In order to strip such caps from molding apparatus, it is necessary to first release the annular web from confinement between the opposed mold surfaces defining the web to prevent tearing of the web.

An object of this invention is to provide molding apparatus for molding a one-piece plastic cap having a base, a peripheral flange extending axially therefrom, and a plurality of inwardly projecting locking lugs on the inner surface of the base wherein the cap can be stripped from the mold by flexibly forcing the lugs out of notches recessed in a surface of a portion of the molding apparatus.

Another object is to provide molding apparatus for molding a one-piece plastic cap having a base with a peripheral flange extending therefrom and a plurality of lugs projecting inwardly from the inner surface of the flange wherein notches, each having an upwardly and outwardly extending surface, are recessed in an outer surface of a core member for defining the lugs and permitting the lugs to be flexibly forced from the notches as the cap is stripped from said core member.

Still another object lies in the provision of molding apparatus for molding a one-piece plastic safety cap having a base, a peripheral flange extending axially therefrom, a plurlity of locking lugs projecting inwardly from the inner surface of the flange, and a flexible annular web extending axially and radially from the base for engaging a container to which the cap is applied and biasing the lugs into engagement with locking elements on the container, wherein the cap can be stripped from the mold without damage by sequentially releasing the web from confinement between opposed mold surfaces and then stripping the cap from the mold portion by flexibly forcing the lugs from notches recessed in a surface of a portion of the molding apparatus and simultaneously flexibly distorting the web to remove it from a portion of the mold.

In carrying out the foregoing, and other objects, molding apparatus according to the present invention includes a first mold portion having a cavity with an end surface for defining the outer surface of a base of a cap and a side surface extending from the periphery of the end surface for defining the outer surface of a peripheral flange of the cap, and a second mold portion that projects into the cavity and has an upper surface for defining the inner surface of the base of the cap and an outer surface for defining the inner surface of the peripheral flange of the cap with a plurality of notches recessed in the outer surface for defining inwardly projecting locking lugs on the flange of the cap. Each of the notches has a surface extending upwardly and outwardly to the outer surface so that the lugs can be flexibly forced out of the notches by axial movement of the cap relative to said second mold portion. A third mold portion including stripper means engages the free end of the flange of the cap and moves axially relative to the second mold portion after the first mold portion has been separated therefrom to strip the cap from the second mold portion.

The second mold portion further includes an annular slot for defining a flexible annular web on the cap. More specifically, the second mold portion may include a pair of core members axially movable relative to each other. One of the core members is formed with an annular upper surface with an annular inclined surface defining one surface of the annular slot; and the other core member has an upper surface for defining the remaining portion of the inner surface of the base, and an annular inclined surface for defining the other surface of the annular slot. The free end of the peripheral flange of the cap is defined by the third mold portion including a stripper ring axially slidable relative to the first core member. When the core members are separated to release the web from confinement between the inclined surfaces of the annular slot, the stripper ring moves axially relative to the core members to force the lugs out of the notches, which action is enhanced by the upwardly and outwardly extending surfaces of the notches, and by flexibly distorting the web to remove it from its associated core member.

Other objects, advantages and features of the invention will become apparent from the following description taken in connection with the accompanying drawings in which.

Figure 1:
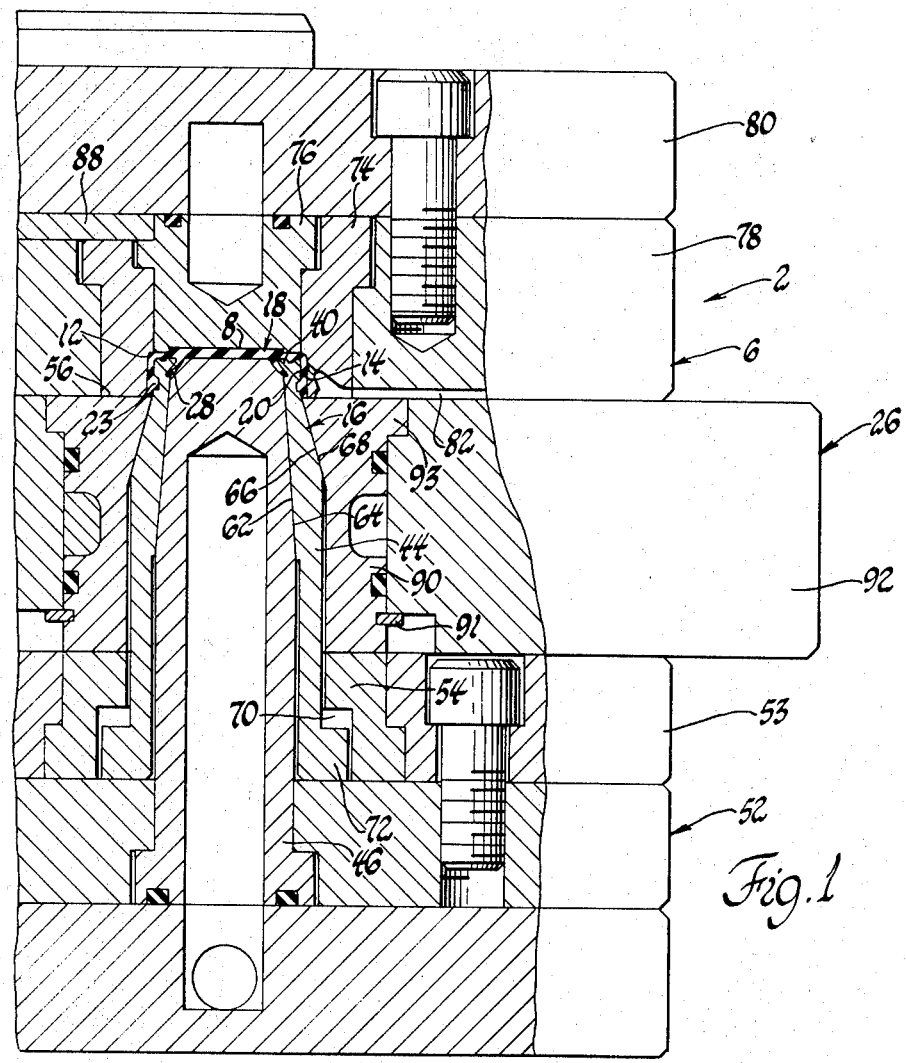
FIG. 1 is a sectional view of molding apparatus according to the invention.
Figure 2:
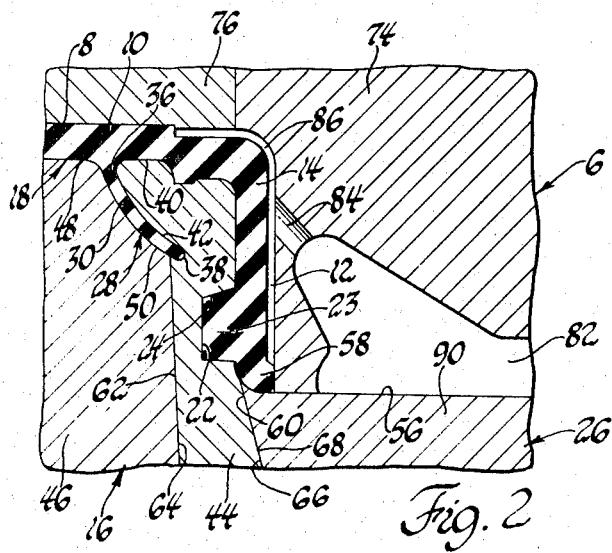
FIG. 2 is an enlarged detail view of the molding apparatus of FIG. 1.
Figure 3:
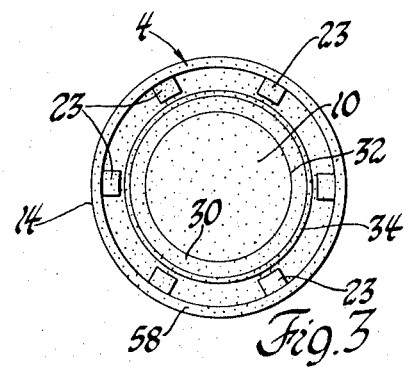
FIG. 3 is a bottom plan view of a cap of the type that can be formed by the molding apparatus of FIGS. 1 and 2.

In the drawings, reference numeral 2 collectively designates molding apparatus for molding a one-piece cap designated generally by reference numeral 4 as shown in FIG. 3, and in section within the molding apparatus in FIGS. 1 and 2. The molding apparatus 2 includes a first mold portion 6 having a cavity formed therein with an end surface 8 for defining the outer surface of a base 10 of the cap 4, and a side surface 12 extending axially from the periphery of the end surface 8 for defining the outer surface of a peripheral flange 14 of the cap, which flange extends axially from the base 10.

The molding apparatus 2 further includes a second mold portion 16 having an upper surface designated generally by reference numeral 18 which is spaced from and cooperates with the end surface 8 of the cavity of mold portion 6 to define the inner surface of the base 10 of cap 4. The second mold portion 16 further includes an outer surface 20 spaced from and cooperating with the side surface 12 of the cavity of the first mold portion 6 to define the inner surface of the peripheral flange 14 of the cap. Recessed in the outer surface 20 of the second mold portion 16 is a plurality of notches 22 for defining inwardly projecting locking lugs 23 on the flange of cap 4. Each of the notches 22 is provided with a surface 24 that extends upwardly and outwardly to the outer surface 20 to facilitate removal of the lugs 23 from the notches 22 when the cap is stripped from the molding apparatus.

The molding apparatus 2 further includes a third mold portion or stripper means 26 operable in a manner to be described below to strip a cap from the second mold portion subsequent to separation of the first mold portion therefrom by flexibly forcing the lugs 23 from the notches 22.

Formed in the second mold portion 16 is an annular slot 28 for defining an axially extending annular flexible web 30 for the cap 4. The annular flexible web 30 of the cap has an inner annular end 32 joined integrally to the inner surface of base 10 and an outer annular free end 34 which is spaced axially from the base 10. Consequently, the annular slot 28 has an inner end 36 at the upper surface 18 of the second mold portion 16 and an outer end 38 spaced axially from the upper surface 18 of the second mold portion 16. The outer end 38 of slot 28 is of a different diameter than the inner end 36, and consequently, one portion 40 of the upper surface 18 defines an acute angle with one surface 42 of slot 28.

The second mold portion 16 includes a plurality of relatively movable core members. Specifically, the second mold portion 16 includes a first core member 44 which is formed with the portion 40 of the upper surface of the second mold portion and the annular inclined surface 42 of the slot 28. The second mold portion 16 further includes a second core member 46 formed with the second or remaining portion 48 of the upper surface 18 and a second annular inclined surface 50 defining the other surface of the annular slot 28.

In the illustrated embodiment, the outer end 38 of slot 28 is larger than the inner end 36 such that the annular inclined surface 42 of the first core member 44 extends axially and radially outwardly from the first portion 40 of the upper surface 18, and the portion 40 of the upper surface extends radially inwardly from the upper edge of the outer surface 20 which is formed on the first core member 44.

As shown in the drawing, the first core member 44 is of annular cross section and is slidably mounted on the second core member for movement with respect thereto between a molding position shown in the drawing for molding a cap, and an open position for releasing the web 30 of the cap 4 from confinement between the annular inclined surfaces 42 and 50 of the first and second core members 44 and 46, respectively. Releasing the web thusly permits the cap 4 to be stripped from the first core member 44 by flexibly distorting the web 30 to remove it from the annular inclined surface 42 of the first core member 44.

The molding apparatus 2 further includes a base member 52, and the second core member 46 is fixedly mounted on the base member 52. The first core member 44 is seated on the upper surface of the base member 52 when it is in the molding position, and is movable out of engagement with the upper surface of the base member 52 when it moves to its open position relative to the second core member 46 to release the web 30. Upward movement of the first core member 44 relative to the base member 52 and the second core member 46 is limited by a retainer 53 having stop means 54 engageable by the first core member 44 in its open position to prevent further axial movement of the core member 46 away from the molded position.

The third mold portion or stripper means 26 is slidably mounted on the first core member 44 for axial movement from a molding position in which it is seated on the retainer 52. The stripper means 26 has a radially outwardly extending upper surface 56 which cooperates with the first mold portion 6 and the first core member 44 to define the free edge 58 of the flange of the cap. As is apparent in the drawing, when the first mold portion 6 is axially separated from the second mold portion 16 to release the outer surfaces of the cap, upward movement of the stripper means sequentially lifts the first core member 44 into engagement with the stop means 54 to separate the annular inclined surfaces 42 and 50, and then axially strips the cap from the first core member 44 by forcing the lugs 23 out of notches 22. The latter action is enhanced by the camming action between the lug 23 and the surface 24 of the notch 22.

As shown in FIG. 2, the inner annular edge 60 of the upper surface 56 of the stripper means 26 extends upwardly and inwardly to define an upwardly and inwardly extending free edge 58 on the flange of the cap. The upwardly and inwardly curved surface of the stripper means 56 further improves the ability of the stripper means to strip the cap from the notches 22.

The second core member is formed with an upper, outer side wall 62 which is tapered outwardly from the lower end of the annular inclined surface 50. The first core member 44 has an upper, inner side wall 64 extending from the lower end of its annular inclined surface 42 which is tapered complementarily to side wall 62 of the second core member 46 and is engageable therewith in the molding position of the two core members. Additionally, the first core member 44 is formed with an upper, outer side wall 66 which is tapered outwardly as it extends from the lower end of the outer surface 20, and the stripper means 26 has an upper, inner side wall 68 extending from its upper surface and tapered complementarily with respect to the side wall 66 of the first core member and is engageable therewith in the molding position. As shown in FIG. 1, the retainer 53 is formed with an axial opening 70 through which the first and second core members project, and the stop means 54 is in the form of an inwardly projecting flange on the upper end of the opening 70 opposite the upper surface of the base member 52. The stop flange 54 cooperates with an outwardly projecting flange 72 on the lower end of the first core member 44 to stop the first core member from movement beyond the open position.

The first mold portion 6 includes a cavity ring 74 having a stepped internal diameter. Axially received in cavity ring 74 is a cavity insert 76 having a complementary stepped external diameter. Cavity insert 76 is formed with the end wall 8 of the cavity, and the cavity ring 74 is formed with the side surface 12 thereof. The cavity ring 74 is engaged with a cavity retainer plate 78 secured to a cover plate 80. Plastic is injected through a passage 82 in the cavity retainer plate 78 and flows through a port 84 in the cavity ring 74 to fill the space between the mold portions. In the illustrated embodiment, the cavity insert 76 and the cavity ring 74 are provided with a plurality of ribs or projections 86 for defining alternating grooves and ribs in the peripheral portion of the base of the cap and the outer surface of the flange of the cap. A key 88 engages corresponding grooves in the cavity ring 74, cavity insert 76 and retainer plate 78 to maintain the parts in proper orientation.

Stripper means 26 includes a stripper ring 90 and a stripper plate 92 secured to the stripper ring against axial movement relative thereto by a snap ring 91 and a shoulder 93 on stripper ring 90.

While a specific form of the invention has been illustrated and described, it should be understood that the invention is not limited to the exact construction shown but that various alterations and modifications in the construction or arrangement of parts will be possible without departing from the scope and the spirit of the invention.

The embodiments of the invention in which an exclusive property or privilege is claimed are defined as follows:

1. Molding apparatus for molding a one-piece plastic cap comprising: a first mold portion having a cavity formed therein, said cavity having an end surface for defining the outer surface of a base of the cap, and a side surface extending from the periphery of said end surface for defining the outer surface of a peripheral flange of the cap; a second mold portion projecting into said cavity, said second mold portion having an upper surface spaced from and cooperating with said end surface to define the inner surface of the base of the cap, an outer surface spaced from and cooperating with said side surface to define the inner surface of the peripheral flange of the cap, and a plurality of notches recessed in said outer surface for defining inwardly projecting locking lugs on the peripheral flange of the cap, said notches each having a surface extending upwardly and outwardly to said outer surface; and stripper means operable to axially strip a cap from said second mold portion when said first mold portion is separated therefrom by flexibly forcing the lugs from said notches.

2. Molding apparatus as claimed in claim 1 further including an annular slot in said second mold portion depending from said upper surface for defining an axially extending annular flexible web for the cap.

3. Molding apparatus as claimed in claim 2 wherein said annular slot has an inner end at said upper surface and an outer end spaced axially from said upper surface and of a different diameter than said inner end such that one portion of said upper surface defines an acute angle with one surface of said annular slot.

4. Molding apparatus as claimed in claim 3 wherein said second mold portion comprises a plurality of relatively movable core members.

5. Molding apparatus as claimed in claim 4 wherein said plurality of core members comprises a first core member formed with said one portion of said upper surface and an annular inclined surface defining said one surface of said annular slot; and a second core member formed with the remaining portion of said upper surface and an annular inclined surface defining the other surface of said annular slot.

6. Molding apparatus as claimed in claim 5 wherein said outer surface is formed on one of said first and second core members.

7. Molding apparatus as claimed in claim 6 wherein the outer end of said annular slot is larger than said inner end such that the annular inclined surface of said first core member extends axially and radially outwardly from said one portion of said upper surface, and said outer surface is formed on said first core member.

8. Molding apparatus as claimed in claim 7 wherein said first core member is of annular cross section and is slidably mounted on said second core member for movement with respect thereto between a molding position for molding a cap and an open position for releasing the web of the cap from confinement between the annular inclined surfaces of said core members and permit the cap to be stripped from the first core member by distorting the web to remove it from the annular inclined surface of said first core member.

9. Molding apparatus as claimed in claim 8 further including a base member, said second core member being fixedly mounted on said base member; said first core member being seated on said base member in the molding position and being spaced from said base member upon movement to the open position relative to the second core member.

10. Molding apparatus as claimed in claim 9 further including a retainer mounted on said base member having stop means engageable by said first core member in the open position to prevent further axial movement of the first core member away from the molding position.

11. Molding apparatus as claimed in claim 10 wherein said stripper means is slidably mounted on said first core member for axial movement from a molding position in which it is seated on said retainer, said stripper means having a radially extending upper surface cooperating with said first mold portion and said first core member to define the edge of the flange of the cap, whereby upon separation of said first mold portion from said second mold portion subsequent to molding a cap, axial movement of the stripper means sequentially moves the first core member to its open position and then strips the cap from said first core member upon further movement of the stripper means away from its molding position.

12. Molding apparatus as claimed in claim 11 wherein the inner annular edge of the upper surface of the stripper means extends upwardly and inwardly to define an upwardly and inwardly extending edge on the flange of the cap.

13. Molding apparatus as claimed in claim 12 wherein said second core member is formed with an upper, outer side wall tapered outwardly from the lower end of its inclined annular surface; and said first core member has an upper inner side wall extending from the lower end of its annular inclined surface, said upper inner side wall being tapered complementarily to the upper, outer side wall of said second core member and engageable therewith in the molding position of the core members.

14. Molding apparatus as claimed in claim 13 wherein said first core member is formed with an upper, outer side wall tapered outwardly as it extends from the lower end of said outer surface; and said stripper means has an upper, inner side wall extending from its upper surface and tapered complementarily with respect to the upper, outer side wall of said first core member and engageable therewith in the molding position.

15. Molding apparatus as claimed in claim 14 wherein said retainer includes an axial opening, said first and second core members projecting through said opening; said stop means comprising an inwardly projecting flange on the end of said opening opposite the base member; and further including an outwardly projecting flange on the end of said first core member engageable with said inwardly projecting flange in the open position of the core members.

16. Molding apparatus as claimed in claim 1 wherein the upwardly and outwardly extending surface of each of said notches lies in a plane inclined upwardly to said outer surface.

17. Molding apparatus as claimed in claim 1 wherein said stripper means comprises a stripper ring slidably mounted on said second mold portion and having a radially extending upper surface cooperating with said mold portions to define the free edge of the flange of the cap.

18. Molding apparatus as claimed in claim 17 wherein the inner edge of the upper surface of the stripper ring extends upwardly and inwardly to define an upwardly and inwardly extending edge on the flange of the cap.

19. Molding apparatus for molding a one-piece plastic cap having a base, a peripheral flange extending axially therefrom, a plurality of inwardly projecting lugs on the inner surface of said flange, and a flexible annular web surrounded by said flange and having an inner annular end integral with the inner surface of said base and an outer annular free end spaced axially from said base and of a different diameter than the inner end such that one portion of the inner surface of the base defines an acute angle with one surface of the web, said molding apparatus comprising: a first mold portion having a cavity for defining the outer surface of said base and the outer surface of said flange; a second mold portion having a first upper surface for defining said one portion of the inner surface of the base, a first annular inclined surface for defining said one surface of the web, a second upper surface for defining the remaining portion of the inner surface of the base, a second annular inclined surface for defining the other surface of the web, an outer surface for defining the inner surface of the flange, and a plurality of notches recessed in said outer surface for defining said lugs, said notches each having a surface extending upwardly and outwardly to said outer surface; and a third mold portion slidably mounted on said second mold portion, said third mold portion having an upper surface defining the free edge of said flange; said first mold portion being separable from said second mold portion, and said first upper surface and first inclined surface being separable from said second upper surface and second inclined surface, respectively, to permit a cap to be stripped from said second mold portion by axial movement of said third mold portion relative to said second mold portion to force the lugs from said notches and said web from one of said annular inclined surfaces.

20. Molding apparatus as claimed in claim 19 wherein said third mold portion comprises a stripper ring having an axial opening slidably receiving said second mold portion, and the inner edge of said upper surface extends upwardly and inwardly to define an upwardly and inwardly extending free edge on said peripheral flange.

21. Molding apparatus as claimed in claim 19 wherein said upwardly and outwardly extending surface of each of said notches lies in a plane inclined upwardly and outwardly to said outer surface.

22. Molding apparatus as claimed in claim 19 wherein said second mold portion comprises a plurality of relatively movable core members with said first upper surface and first annular inclined surface being located on a first core member, and said second upper surface and second annular inclined surface being located on a second core member.

23. Molding apparatus as claimed in claim 19 wherein said second mold portion comprises a pair of relatively movable core members with said first upper surface and first annular inclined surface located on a first core member of said pair, and said second upper surface and second annular inclined surface located on a second core member of said pair; said outer surface being located on one of said first and second core members.

24. Molding apparatus as claimed in claim 19 wherein said second mold portion comprises: a first core member formed with said outer surface, said first upper surface and said first annular inclined surface, said first upper surface extending radially inwardly from the upper edge of said outer surface and said first annular inclined surface extending axially and radially outwardly from the inner edge of said first upper surface; and a second core member formed with said second upper surface and said second annular inclined surface, said second annular inclined surface extending axially and radially outwardly from the periphery of said second upper surface; said first and second core members being movable axially relative to each other to release the web from confinement between said annular inclined surfaces.

25. Molding apparatus for molding a one-piece plastic cap having an imperforate base, a peripheral flange extending axially therefrom, a plurality of inwardly projecting lugs on the inner surface of the flange, and a flexible annular web extending axially and radially outwardly from the inner surface of the base, said molding apparatus comprising: a cavity member having a cavity for defining the outer surface of said base and the outer surface of said flange; a first core member having a first annular upper surface for defining that portion of the inner surface of the base located between said annular web and said flange, an outer surface extending axially from the outer edge of said upper surface for defining the inner surface of said flange, a plurality of notches recessed in said outer surface for defining said lugs, said notches each having a surface extending upwardly and outwardly to said outer surface, and a first annular inclined surface extending axially and radially outwardly from the inner edge of said first upper surface for defining the outer surface of said web; a second core member slidable in said first core member and having a second upper surface for defining that portion of the inner surface of the base surrounded by the web, and a second annular inclined surface extending axially and radially outwardly from the edge of said second upper surface to define the inner surface of said web; and a stripper ring slidably mounted on said first core member, said stripper ring having an upper surface for defining the free edge of said flange.

References Cited

UNITED STATES PATENTS

| | | | |
|---|---|---|---|
| 3,013,308 | 12/1961 | Armour | 18—2RPX |
| 3,020,594 | 2/1962 | Makowski | 18—2RPX |
| 3,049,758 | 8/1962 | Drevalas | 18—2RPX |
| 3,343,222 | 9/1967 | Kacalieff | 18—2RPX |
| 3,482,814 | 12/1969 | Hedgewick | 18—2RPX |

FOREIGN PATENTS

| | | | |
|---|---|---|---|
| 1,270,357 | 7/1961 | France | 18—2RS |

J. HOWARD FLINT, Jr., Primary Examiner

U.S. Cl. X.R.

18—42; 249—66